(12) United States Patent
Nanda

(10) Patent No.: US 11,237,459 B2
(45) Date of Patent: Feb. 1, 2022

(54) CAMERA COMPRISING A LIGHT-REFRACTING APPARATUS FOR DISPERSING LIGHT

(71) Applicant: Avigilon Corporation, Vancouver (CA)

(72) Inventor: Amar Nanda, Surrey (CA)

(73) Assignee: AVIGILON CORPORATION, Vancouver (CA)

( * ) Notice: Subject to any disclaimer, the term of this patent is extended or adjusted under 35 U.S.C. 154(b) by 0 days.

(21) Appl. No.: 16/440,873

(22) Filed: Jun. 13, 2019

(65) Prior Publication Data

US 2020/0393741 A1    Dec. 17, 2020

Related U.S. Application Data

(63) Continuation-in-part of application No. 16/439,630, filed on Jun. 12, 2019, now abandoned.

(51) Int. Cl.
*G03B 15/05* (2021.01)
*G02B 27/30* (2006.01)
*G02B 3/04* (2006.01)

(52) U.S. Cl.
CPC .............. *G03B 15/05* (2013.01); *G02B 3/04* (2013.01); *G02B 27/30* (2013.01); *G03B 2215/0567* (2013.01); *G03B 2215/0592* (2013.01)

(58) Field of Classification Search
USPC ........................................................ 396/199
See application file for complete search history.

(56) References Cited

U.S. PATENT DOCUMENTS

| | | | |
|---|---|---|---|
| 4,767,172 A * | 8/1988 | Nichols ................. | F21V 7/0091 355/1 |
| 5,526,190 A * | 6/1996 | Hubble, III ........... | F21V 7/0091 347/102 |
| 6,724,543 B1 * | 4/2004 | Chinniah ............... | G02B 13/18 359/718 |
| 7,254,309 B1 | 8/2007 | Chou et al. | |
| 7,580,192 B1 * | 8/2009 | Chu ....................... | F21V 7/0091 359/641 |
| 8,395,183 B2 * | 3/2013 | Lee ......................... | H01L 33/58 257/102 |
| 8,419,226 B2 * | 4/2013 | Fu ............................ | F21V 5/04 362/299 |
| 8,469,552 B2 * | 6/2013 | Moeller ................. | F21V 7/0091 362/311.02 |
| 8,602,602 B2 | 12/2013 | Anaokar et al. | |
| 8,946,636 B2 | 2/2015 | Afrooze et al. | |
| 9,541,257 B2 * | 1/2017 | Castillo ................... | F21V 13/04 |
| 2004/0070855 A1 * | 4/2004 | Benitez .............. | G02B 19/0028 359/858 |
| 2007/0114549 A1 * | 5/2007 | Yu ........................... | H01L 33/58 257/98 |

(Continued)

*Primary Examiner* — Rodney E Fuller
(74) *Attorney, Agent, or Firm* — Perry + Currier, Inc.

(57) ABSTRACT

A camera includes a housing, a light source positioned within the housing, and a light-refracting apparatus. The light-refracting apparatus comprises a collimator shaped to collimate light emitted by the light source, and a lens comprising an at least partially concave light-emitting surface positioned to receive light collimated by the collimator and shaped to disperse the collimated light. The light-refracting apparatus is arranged to cause the dispersed light to be transmitted from within the housing into a field of view region of the camera.

27 Claims, 10 Drawing Sheets

(56) References Cited

U.S. PATENT DOCUMENTS

| | | | |
|---|---|---|---|
| 2008/0013322 A1* | 1/2008 | Ohkawa | G02B 19/0028 362/311.06 |
| 2008/0304277 A1* | 12/2008 | Chinniah | G02B 17/004 362/507 |
| 2008/0310028 A1* | 12/2008 | Chinniah | F21V 7/0091 359/642 |
| 2008/0310159 A1* | 12/2008 | Chinniah | F21S 43/315 362/244 |
| 2008/0316761 A1* | 12/2008 | Minano | G02B 3/0068 362/518 |
| 2009/0225405 A1 | 9/2009 | Fujimoto | |
| 2010/0014286 A1* | 1/2010 | Yoneda | F21V 5/04 362/231 |
| 2010/0061118 A1 | 3/2010 | Liu | |
| 2010/0110695 A1* | 5/2010 | Nakamura | G02B 19/0061 362/311.09 |
| 2010/0177495 A1* | 7/2010 | Van Oers | F21V 9/30 362/84 |
| 2010/0328941 A1* | 12/2010 | Zhang | F21V 5/04 362/235 |
| 2011/0085210 A1 | 4/2011 | Chen et al. | |
| 2013/0063953 A1 | 3/2013 | Lee et al. | |
| 2013/0146911 A1 | 6/2013 | Lin et al. | |
| 2014/0056007 A1 | 2/2014 | Chou | |
| 2014/0203315 A1* | 7/2014 | Kim | G02B 19/0028 257/98 |
| 2015/0167935 A1* | 6/2015 | Beghelli | F21V 7/06 362/268 |
| 2015/0219313 A1* | 8/2015 | Marcaly | F21V 7/0075 362/309 |
| 2016/0209025 A1* | 7/2016 | Matthews | F21V 17/104 |
| 2017/0234497 A1 | 8/2017 | Courcier et al. | |
| 2018/0024371 A1* | 1/2018 | Schwaiger | G02B 27/0927 372/29.01 |
| 2018/0328581 A1* | 11/2018 | Komanduri | F21V 7/0083 |

\* cited by examiner

CAMERA COMPRISING A LIGHT-REFRACTING APPARATUS FOR DISPERSING LIGHT

FIELD OF THE DISCLOSURE

The present disclosure relates to a camera comprising a light-refracting apparatus for dispersing light, and to a light-refracting apparatus comprising a collimator and a lens.

BACKGROUND TO THE DISCLOSURE

Infrared (IR) cameras, such as those used in the surveillance industry, are designed to capture images of objects when ambient visible light levels are low. In order to properly capture an image, IR cameras typically include one or more light sources such as IR light-emitting diodes (LEDs) for illuminating the scene. Depending on the requirements of the illumination, the light beam emitted by a light source may be shaped using one or more optical components.

SUMMARY OF THE DISCLOSURE

According to a first aspect of the disclosure, there is provided a camera comprising: a housing; a light source positioned within the housing; and a light-refracting apparatus comprising: a collimator shaped to collimate light emitted by the light source; and a lens comprising an at least partially concave light-emitting surface positioned to receive light collimated by the collimator and shaped to disperse the collimated light. The light-refracting apparatus is arranged to cause the dispersed light to be transmitted from within the housing into a field of view region of the camera.

The light-refracting apparatus may comprise a recess at least partially enclosing the light source.

The collimator may be shaped to collimate, by total internal reflection, the light emitted by the light source.

The collimator may comprise parabolic sidewalls for collimating the light emitted by the light source.

The light source may comprise one or more light-emitting diodes (LEDs).

The one or more LEDs may comprise one or more dual-filament LEDs.

The light source may be positioned relative to the light-refracting apparatus such that substantially all light emitted by the light source enters the light-refracting apparatus.

The lens may further comprise a light-receiving surface positioned such that light emitted by the light source enters the light-refracting apparatus through the light-receiving surface.

The light-emitting surface may be positioned such that light having entered the light-refracting apparatus exits the light-refracting apparatus through the light-emitting surface.

The light-receiving surface may be at least partially concave.

A concave portion of the light-receiving surface is two-dimensionally concave.

The collimator and the lens may be integrally formed as the light-refracting apparatus, and the light-emitting surface may be a front surface of the light-refracting apparatus.

The lens may further comprise a light-receiving surface, and the light-receiving surface may be a rear surface of the light-refracting apparatus.

A concave portion of the light-emitting surface may be two-dimensionally concave.

The light-emitting surface may comprise one or more straight portions or one or more convex portions extending from a concave portion.

The light-emitting surface may comprise: one or more straight portions extending from the concave portion; and one or more further concave portions or one or more convex portions extending from the concave portion.

The collimator and the lens may be configured such that a light beam emitted by the light source is shaped by the collimator and the lens to illuminate the field of view region. The field of view region may have at least a 110° horizontal extent and at least a 55° vertical extent.

The light source may be a first light source, the camera may further comprise a second light source, and the field of view region able to be illuminated by the first light source may be larger than a field of view region able to be illuminated by the second light source.

The field of view region able to be illuminated by the first light source may have at least a 110° horizontal extent and at least a 55° vertical extent. The field of view region able to be illuminated by the second light source may have at least a 35° horizontal extent and at least a 35° vertical extent.

The camera may further comprise a processor and a computer-readable medium, wherein the processor is communicatively coupled to the computer-readable medium, and the first and second light sources, and wherein the computer-readable medium has stored thereon computer program code executable by the processor and configured such that, when executed by the processor, the processor: activates the first light source in response to an object being detected in a near field; and activates the second light source in response to an object being detected in a far field.

The camera may be a bullet camera, a box camera, or a dome camera.

The light source may be operable to emit infrared light.

The camera may further comprise an image sensor positioned within the housing for detecting light that has entered the housing. For example, light originating from the light source and that has left the camera through one or more first apertures formed within the housing may reflect off of one or more objects in the camera's field of view region, and the reflected light may enter the camera through one or more second apertures formed within the housing and may be detected by the image sensor.

According to a further aspect of the disclosure, there is provided a light-refracting apparatus for a camera, comprising: a recess for at least partially enclosing a light source; a collimator shaped to collimate light having entered the collimator from the recess; and a lens comprising an at least partially concave light-emitting surface positioned to receive light collimated by the collimator and shaped to disperse the collimated light.

According to a further aspect of the disclosure, there is provided a lens comprising: a rear surface; and an at least partially concave front surface, wherein the lens is shaped to collimate, by total internal reflection, light having entered the lens through the rear surface, and to disperse the collimated light through the front surface.

The lens may further comprise parabolic sidewalls.

The front surface may comprise one or more convex portions connected to a concave portion.

The lens may further comprise a recess for at least partially enclosing a light source.

BRIEF DESCRIPTION OF THE DRAWINGS

Embodiments of the disclosure will now be described in conjunction with the accompanying drawings of which.

DETAILED DESCRIPTION

In certain cases, the internal dimensions of some cameras can be restrictively small. With small internal dimensions, it can be difficult to provide an effective optical setup needed to shape a beam that may illuminate a relatively wide angle (e.g. a beam that may be used to properly illuminate objects that are in a near field relative to the camera). Furthermore, increasing the size of the optical components with the goal of achieving a wide-angle beam is complicated by the fact that LEDs typically require heat sinks to deal with the heat that is generated through operation of the LEDs. Increasing the size of the optical components may therefore prevent effective cooling of the LEDs, by reducing available space required for such heat sinks.

With this in mind, the present disclosure seeks to provide a novel optical setup for illuminating wide-angle scenes. While various embodiments of the disclosure are described below, the disclosure is not limited to these embodiments, and variations of these embodiments may well fall within the scope of the disclosure which is to be limited only by the appended claims.

Generally, there is described a light-refracting apparatus suitable for use with a camera. The light-refracting apparatus comprises an integrated collimator and lens. For example, the integrated collimator and lens may be formed of a unitary piece of material. The light-refracting apparatus includes a recess or similar cavity formed in a rear side thereof. A light source, such as one or more LEDs, is at least partially enclosed in the recess, and emits light into the light-refracting apparatus. Light entering the light-refracting apparatus enters via a concave light-receiving surface of the lens. In addition to forming part of the lens, the light-receiving surface may define a rear surface of the collimator. Light passing through the light-receiving surface is collimated by the collimator, using total internal reflection. Light exiting the light-refracting apparatus does so through an at least partially concave light-emitting surface of the lens. In addition to forming part of the lens, the light-emitting surface may define a front surface of the collimator. The at least partially concave light-emitting surface disperses the light exiting the light-refracting apparatus, enabling relatively wide illumination of a scene.

Figure 1:
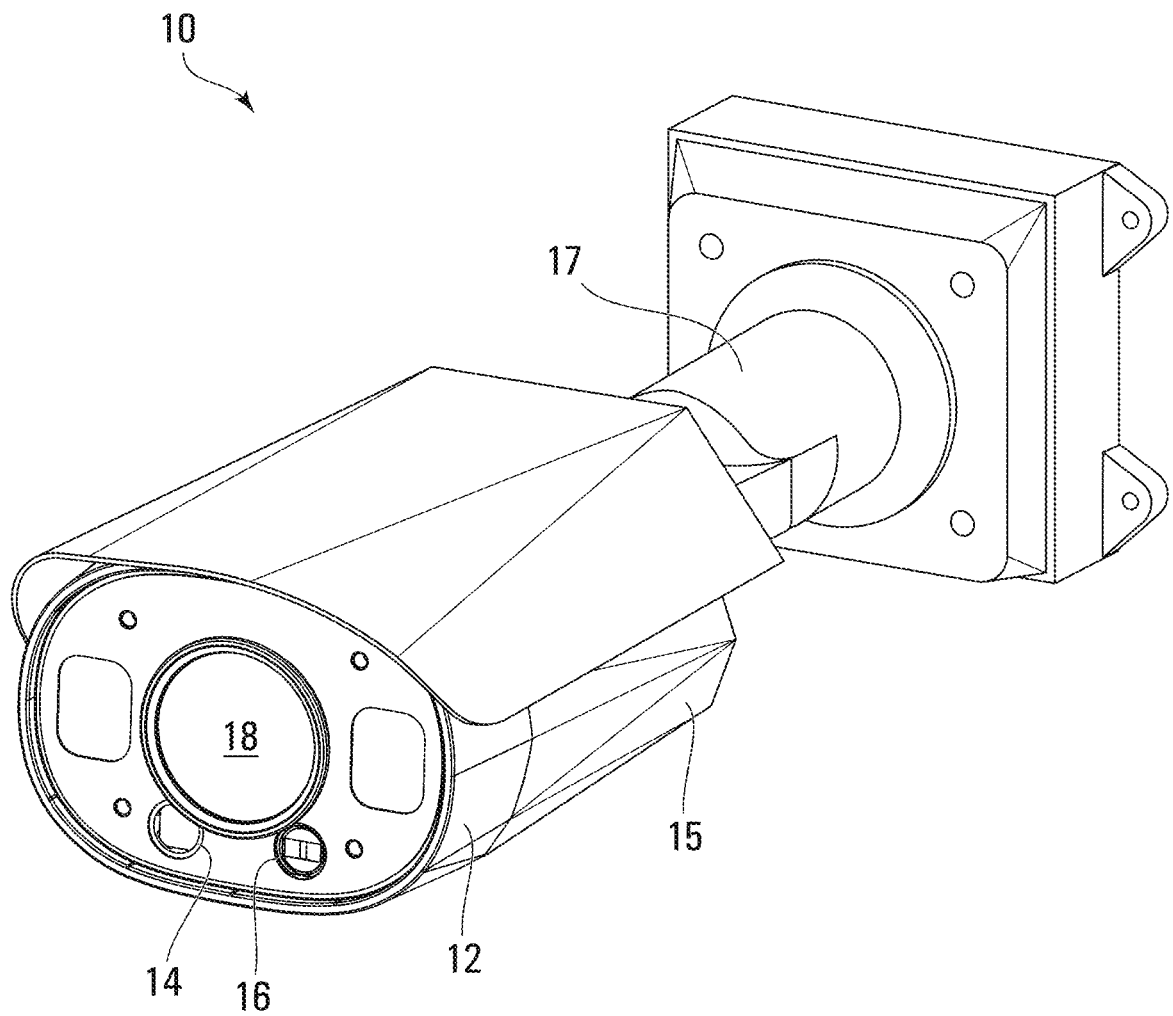
FIG. 1 is a perspective view of a camera according to an embodiment of the disclosure.

Turning to FIG. 1, there is shown a camera 10 according to an embodiment of the disclosure. Camera 10 comprises a camera front portion 12 coupled to a camera body portion 15. Camera body portion 15 is mounted via a movable arm 17 to a wall or other fixture. A central aperture 18 is formed within camera front portion 12. Light entering camera front portion 12 via aperture 18 is directed onto a light sensor (not shown) operable to convert the detected light into one or more electrical signals for processing, as known in the art. For example, the light sensor may be operable to detect light in the infra-red range, although, according to other embodiments, other wavelengths of light may be detected by the light sensor.

In order to illuminate a low-light scene that is to be captured by camera 10, camera 10 is equipped with a pair of IR light sources. The IR light sources (not shown in FIG. 1) are located behind light source apertures 14 and 16 formed within camera front portion 12. In particular, behind light source aperture 14 are provided a far-field lenslet and light source, and behind light source aperture 16 are provided a near-field lenslet and light source. One or more processors (not shown) onboard camera 10, by reading and executing appropriate computer-readable code stored on computer-readable memory, are configured to operate the near-field light source when one or more detected objects are determined by camera 10 to be in a near range (for example, 0-30 meters from camera 10). Conversely, the one or more processors are configured to operate the far-field light source when one or more detected objects are determined by camera 10 to be in a far range (for example, 30-60 meters from camera 10). Alternatively, the decision of whether to illuminate the scene using the near-field light source or the far-field light source may be taken by one or more remote processors that communicate the decision to camera 10.

Figure 2:
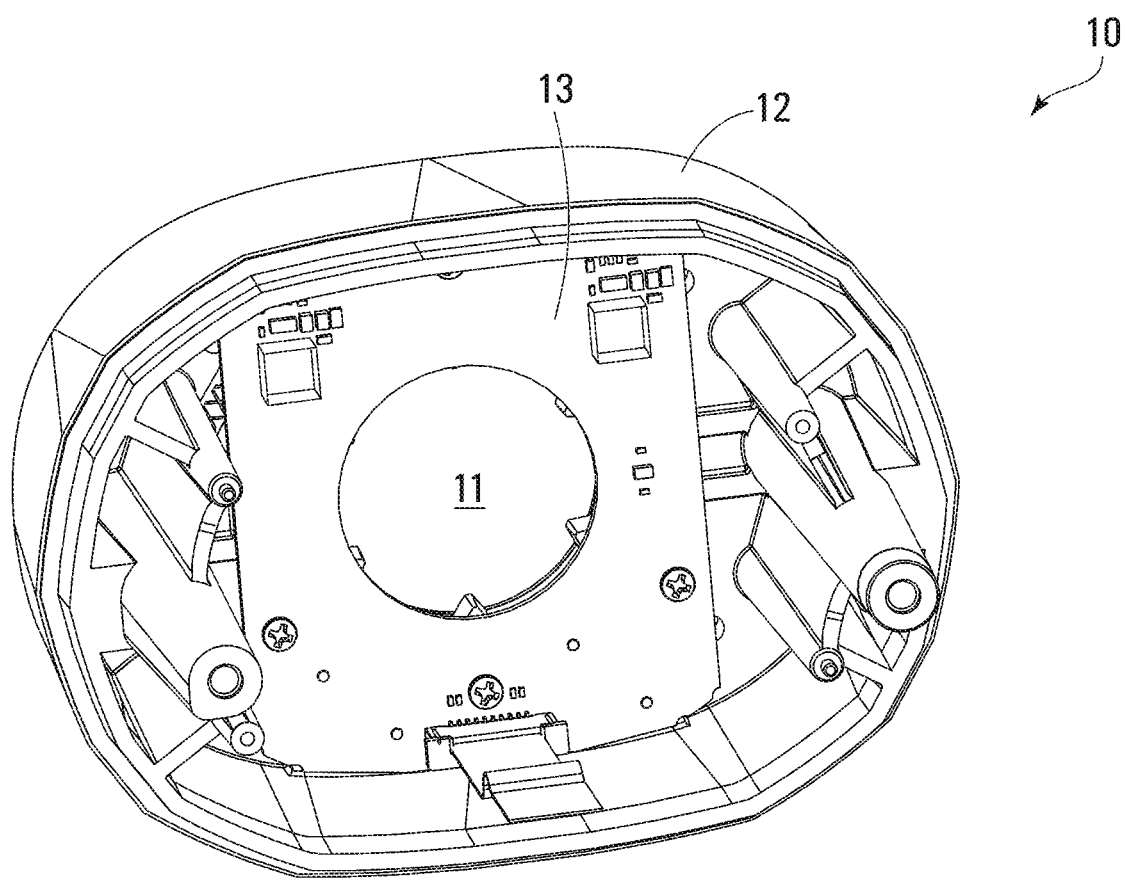
FIG. 2 is a perspective view of a rear of a front portion of the camera of FIG. 1, shown without the camera's body attached, according to an embodiment of the disclosure.

FIG. 2 shows a rear of camera front portion 12, with camera body portion 15 removed. Within camera front portion 12 is provided a PCB 13 including circuitry for operating and controlling the near-field light source and the far-field light source (not shown in FIG. 2). PCB 13 includes a central aperture 11 aligned with aperture 18 for permitting light to enter camera 10 and reach the light sensor (not shown).

Figure 3:
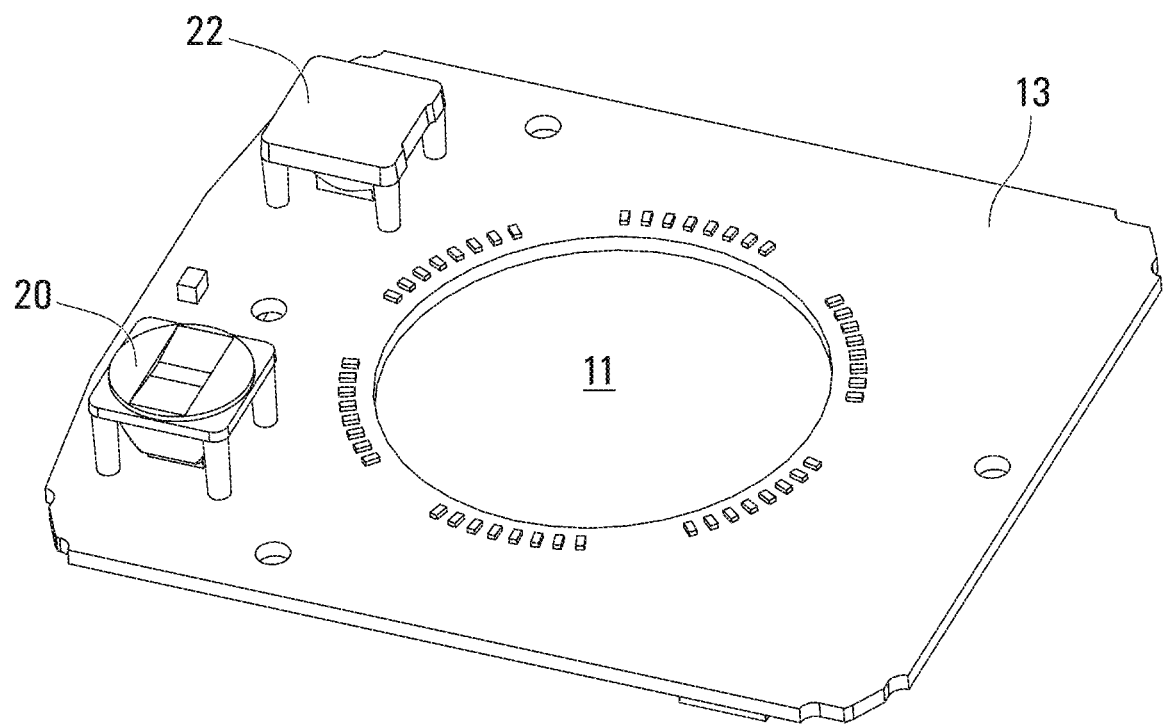
FIG. 3 is a perspective view of a printed circuit board (PCB) including near-field and far-field light-refracting apparatuses, according to an embodiment of the disclosure.

FIG. 3 shows a front side of PCB 13, with a near-field lenslet 20 and a far-field lenslet 22 provided on PCB 13. Hereinafter, near-field lenslet 20 is referred to as light-refracting apparatus 20, and far-field lenslet 22 is referred to as light-refracting apparatus 22. Light-refracting apparatus 20 includes one or more optical components for shaping the beam of light emitted by the near-field light source (not shown in FIG. 3 but located behind light-refracting apparatus 20) in order to illuminate a scene considered to be in the near-field (for example, 0-30 meters from camera 10). Conversely, light-refracting apparatus 22 includes one or more optical components for shaping the beam of light emitted by the far-field light source (not shown in FIG. 3 but located behind light-refracting apparatus 22) in order to illuminate a scene considered to be in the far-field (for example, 30-60 meters from camera 10).

Light-refracting apparatus 20 will now be described in more detail, in accordance with an embodiment of the disclosure.

Figure 4:
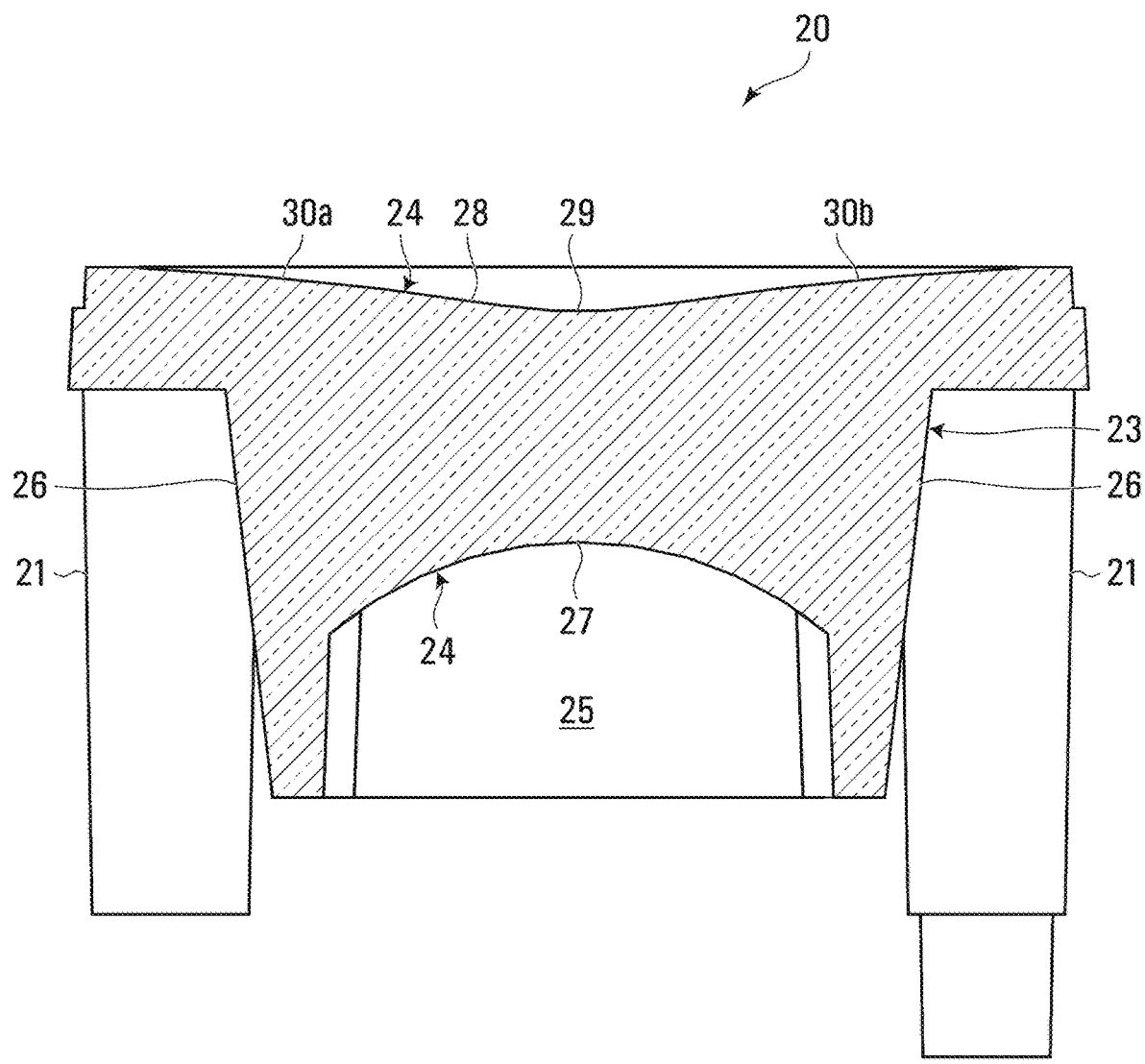
FIG. 4 is a cross-section of a near-field light-refracting apparatus, according to an embodiment of the disclosure.

Turning to FIG. 4, there is shown a cross-sectional view of light-refracting apparatus 20 in greater detail. Light-refracting apparatus 20 comprises a collimator 23 integrally formed with a lens 24. For example, collimator 23 and lens 24 may be formed from a single, unitary piece of material, such as optically clear plastic or glass. At a rear end of light-refracting apparatus 20 (i.e. the end of light-refracting apparatus 20 that is closest to the near-field light source and PCB 13), light-refracting apparatus 20 comprises a recess or cavity 25 formed therein. Cavity 25 at least partially houses or otherwise encloses the near-field light source (not shown; hereinafter referred to as "light source"). According to an embodiment of the disclosure, the light source is an LED light source, which for example may comprise one or more dual-filament LEDs. The light source may be positioned within cavity 25 such that substantially all light emitted by the light source (e.g. at least 90%) enters light-refracting apparatus 20. Supporting posts 21 are attached to light-refracting apparatus 20 and extend away from a front end of light-refracting apparatus 20. Posts 21 are used to secure light-refracting apparatus 20 to PCB 13.

Figure 9:
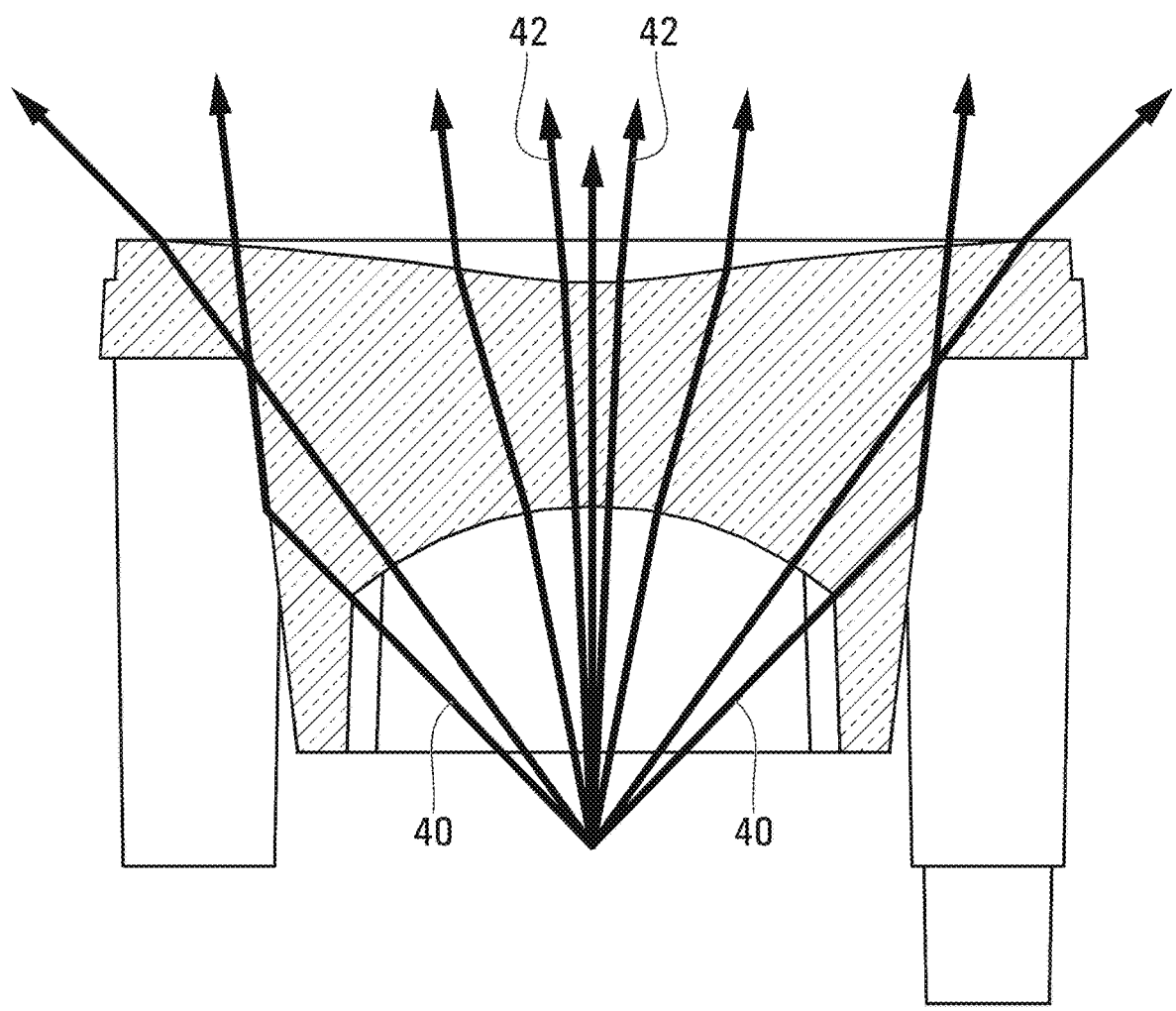
FIG. 9 is another cross-section of the light-refracting apparatus of FIG. 4, showing light ray paths through the light-refracting apparatus, according to an embodiment of the disclosure.

Collimator 23 comprises parabolic sidewalls 26 extending from a rear end of light-refracting apparatus 20 to a front end of light-refracting apparatus 20. Sidewalls 26 are shaped to collimate light that has been emitted from the light source and that has entered light-refracting apparatus 20. In particular, light that enters light-refracting apparatus 20 and is incident on parabolic sidewalls 26 is collimated by total internal reflection, and is directed out of a front of light-refracting apparatus 20. Example light rays passing through light-refracting apparatus 20 are shown in FIG. 9, discussed in more detail below. According to other embodiments, sidewalls 26 may be shaped differently. For example, sidewalls 26 may be linear.

Integrated with collimator 23 is lens 24 for further shaping the light beam emitted by the near-field light source. Lens 24 comprises a light-receiving surface 27 defining a rear surface of collimator 23, and a light-emitting surface 28 defining a front surface of collimator 23. Light-receiving surface 27 is at least partially defined by cavity 25. Light entering light-refracting apparatus 20 from the light source provided within cavity 25 does so via light-receiving surface 27 of lens 24, and exits light-refracting apparatus 20 via light-emitting surface 28 of lens 24.

Light-receiving surface 27 comprises a generally concave shape. In other words, light-receiving surface 27 generally bulges or extends away from the light source. The concave shape of light-receiving surface 27 assists in collimating or otherwise bringing light rays entering light-refracting apparatus 20 closer together. Light-receiving surface 27 of lens 24 is shaped to be two-dimensional. In particular, light-receiving surface 27 consists of a portion of the surface of a cylinder. According to other embodiments of the disclosure, light-receiving surface 27 may have other shapes, and for example may be flat.

Light-emitting surface 28 of lens 24 includes a central concave portion 29. Concave portion 29 of light-emitting surface 28 causes light exiting light-refracting apparatus 20 via concave portion 29 to be dispersed. The dispersion of light exiting light-refracting apparatus 20 through concave portion 29 enables light-refracting apparatus 20 to shape a relatively wide-angle beam. Connected to and extending from concave portion 29 of light-emitting surface 28 are other portions of light-emitting surface 28. In particular, light-emitting surface 28 further includes convex portions 30a and 30b extending from concave portion 29. Convex portions 30a and 30b assist in shaping the beam of light exiting light-refracting apparatus 20 according to a desired beam profile. In particular, convex portions 30a and 30b may ensure that the light is not overly dispersed at the edges of the light beam.

According to other embodiments, the light beam may be shaped differently, depending on the specific requirements. For example, in order to achieve greater dispersion of the light exiting light-refracting apparatus 20, light-emitting surface 28 may be entirely concave. Alternatively, straight portions may extend away from concave portion 29 toward the edge of light-emitting surface 28. According to still further embodiments, convex portions may be extend away from the straight portions toward the edge of light-emitting surface 28.

Figure 5:
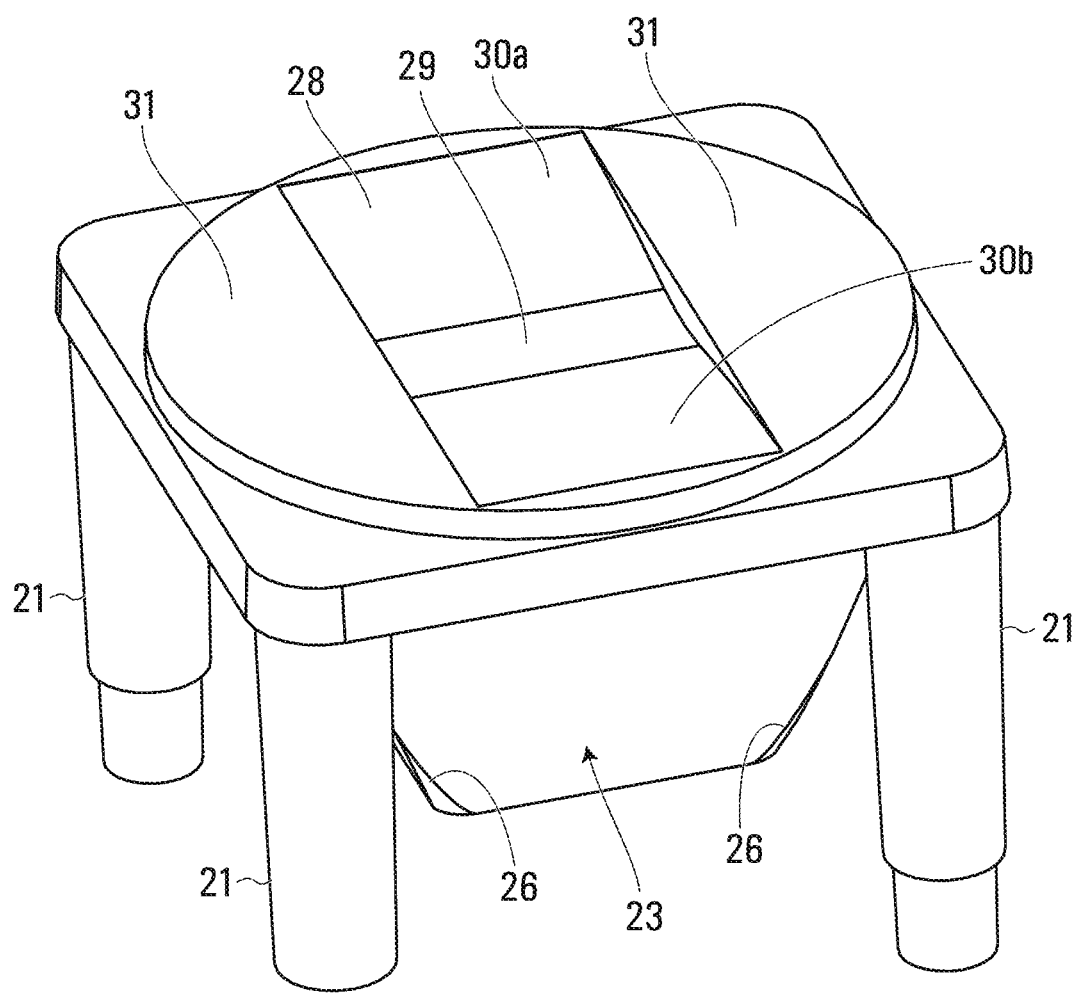
FIG. 5 is a perspective view of the light-refracting apparatus of FIG. 4, according to an embodiment of the disclosure.

Turning to FIG. 5, a front end of light-refracting apparatus 20 is shown in more detail. In order that the light source illuminate a rectangular scene, light-emitting surface 28 of lens 24 is shaped to be two-dimensional, by using optical blocking elements 31. In particular, concave portion 29 of light-emitting surface 28 consists of a portion of the surface of a cylinder, and convex portions 30a and 30b of light-emitting surface 28 also consist of respective portions of the surface of a cylinder. Depending on the desired illumination pattern, light-emitting surface 28 may be shaped differently. For example, by removing optical blocking elements 31, light-emitting surface 28 may be shaped to be three-dimensionally concave, in order to illuminate circularly a scene.

Figure 6:
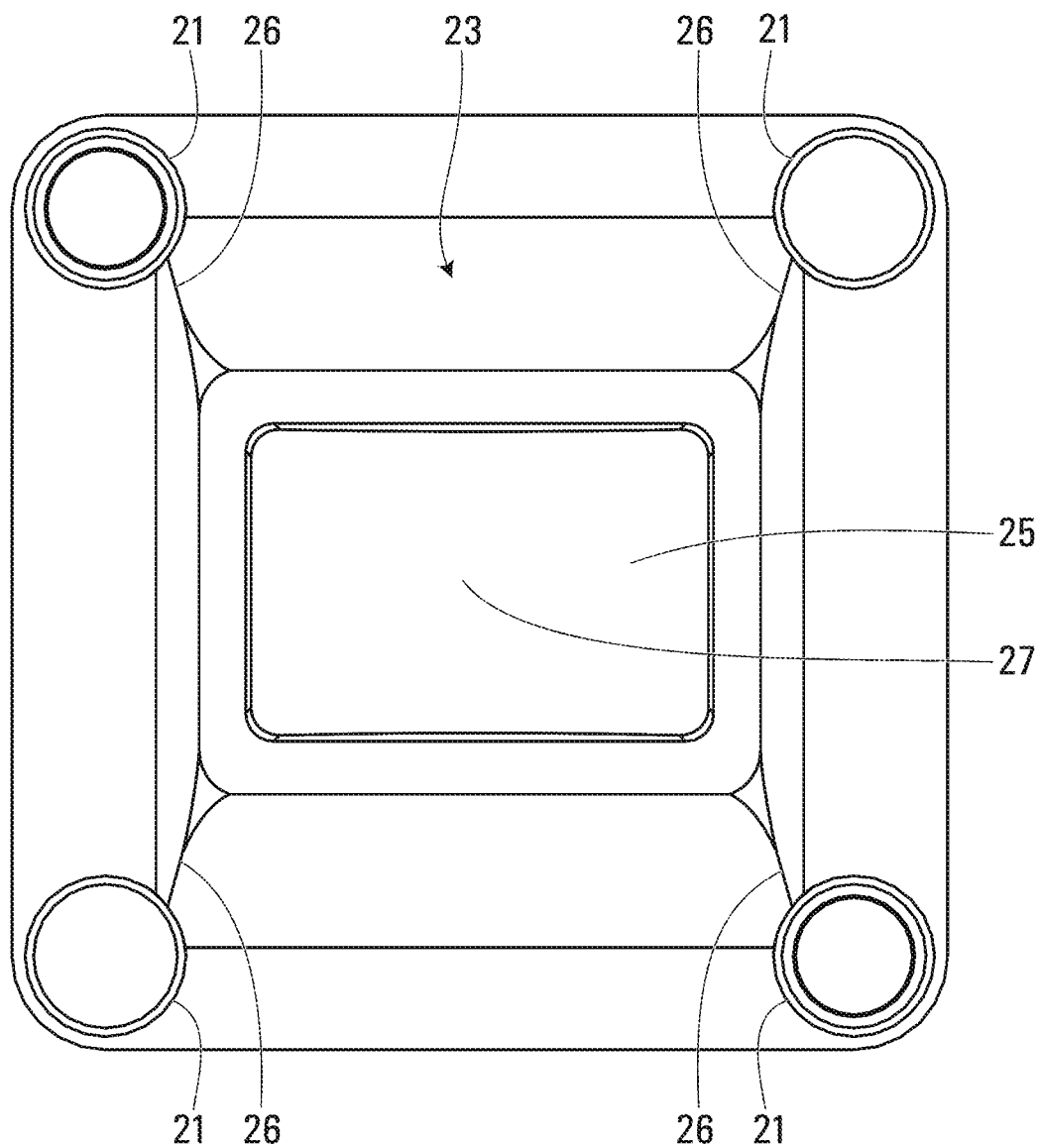
FIG. 6 is a bottom view of the light-refracting apparatus of FIG. 4, according to an embodiment of the disclosure.
Figure 8:
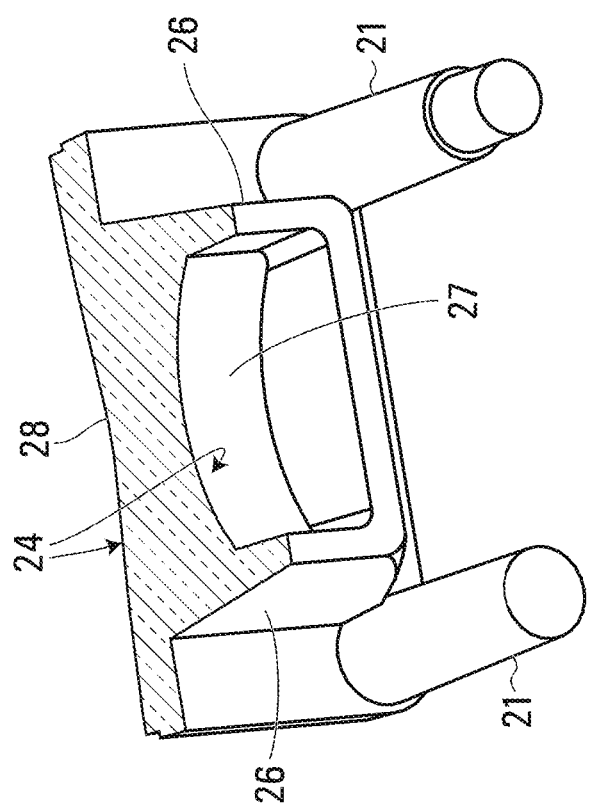
FIGS. 7 and 8 are perspective views of a cross-section of the light-refracting apparatus of FIG. 4, according to an embodiment of the disclosure.
Figure 7:
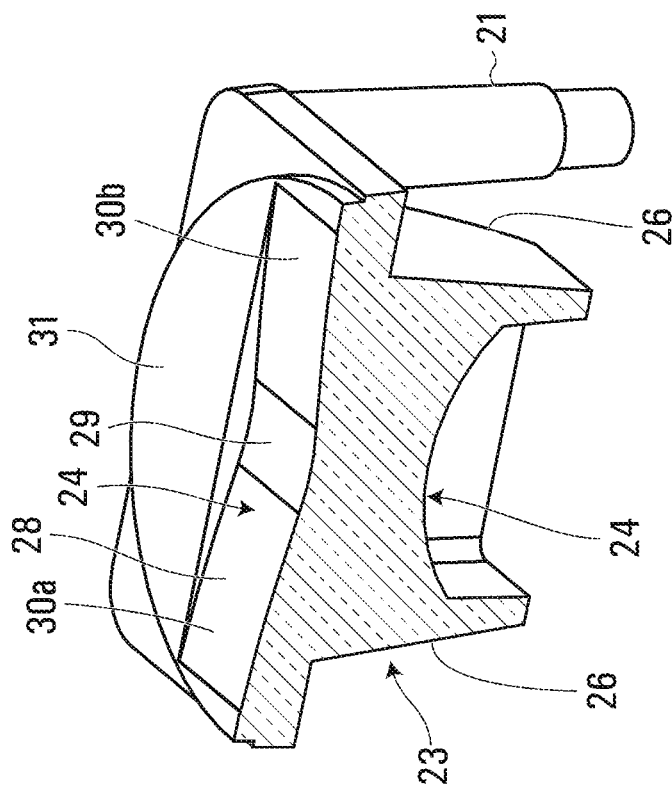

FIG. 6 shows a bottom view of light-refracting apparatus 20, and FIGS. 7 and 8 show perspective views of a cross-section of light-refracting apparatus 20.

FIG. 9 shows example light rays originating from the light source (not shown) and passing through light-refracting apparatus 20. Light rays 40 are incident on parabolic sidewalls 26 of collimator 23, and are collimated through total internal reflection. Light rays 42 and 42 are dispersed by concave portion 29 of light-emitting surface 28 of lens 24.

According to some embodiments of the disclosure, parameters of collimator 23 and lens 24 (e.g. parameters of parabolic sidewalls 26, concave light-receiving surface 27, and concave light-emitting surface 28) are configured such that the field of view region illuminated by the light source has at least a 110° horizontal extent and at least a 55° vertical extent. To achieve different fields of view, the parameters of collimator 23 and lens 24 may be modified. For example, in order to obtain a wider field of view region, the curvature of light-emitting surface 28 toward the outer edge of light-emitting surface 28 may be made concave instead of straight or convex. According to one particular example embodiment, a radius of curvature of light-receiving surface 27 is about 3.77 mm, a radius of curvature of concave portion 29 is about 5 mm, and a radius of curvature of convex portions 30a and 30b is about 35 mm.

Figure 10:
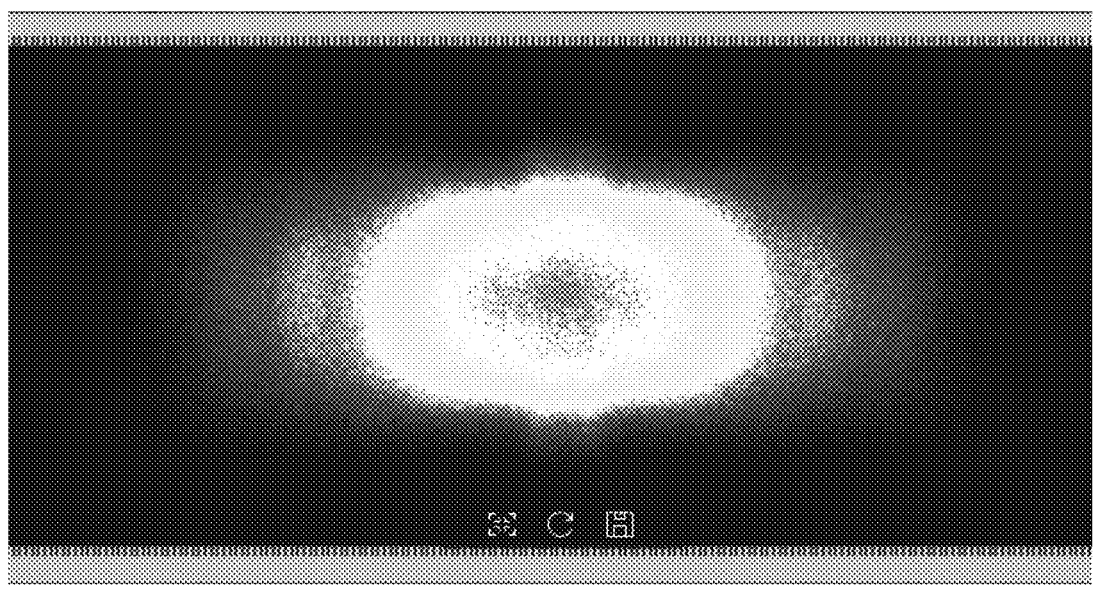
FIGS. 10 and 11 show simulated light distribution patterns using the light-refracting apparatus of FIG. 4, according to an embodiment of the disclosure.
Figure 11:
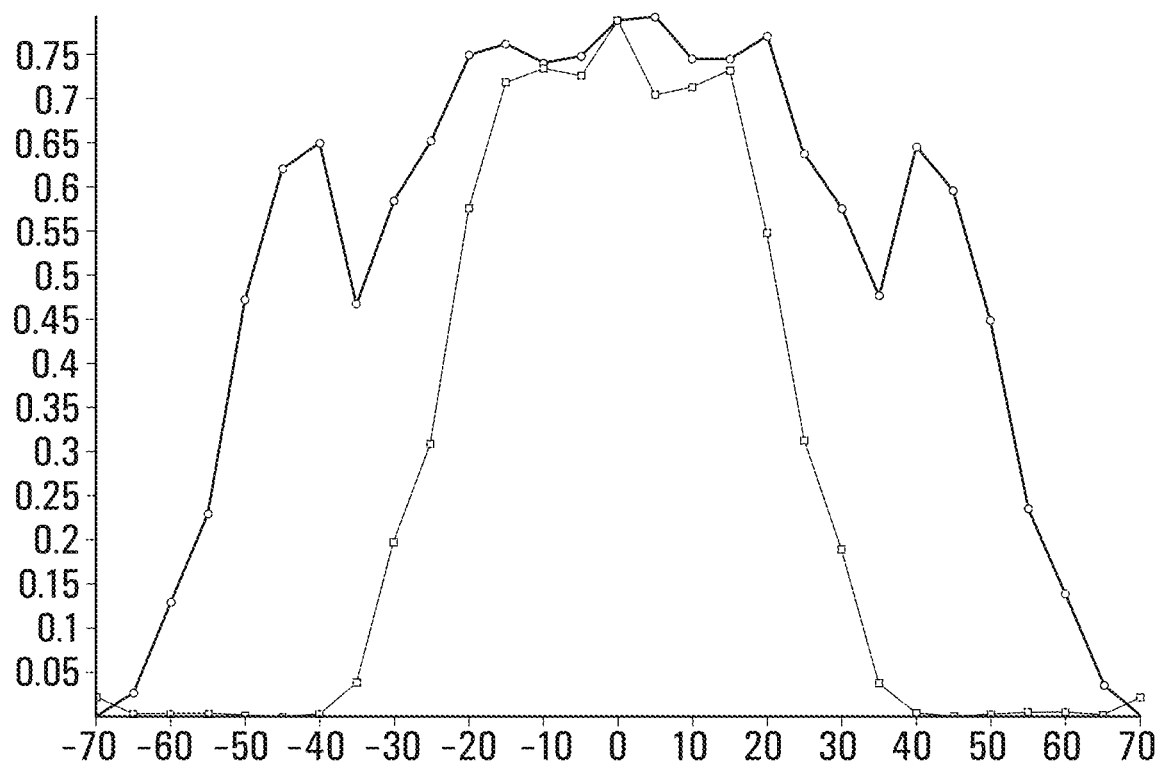

FIGS. 10 and 11 show the results of a simulation of a light distribution pattern obtained using the light-refracting apparatus 20 of FIG. 4. As can be seen from FIG. 11, between the x-axis angles of −55° and +55°, the light intensity is at least about 30% of the maximum light intensity, and the light intensity pattern is reasonably uniform between the angles of −40° and +40°. In FIG. 11, the y-axis represents light intensity in lumens.

Figure 12:
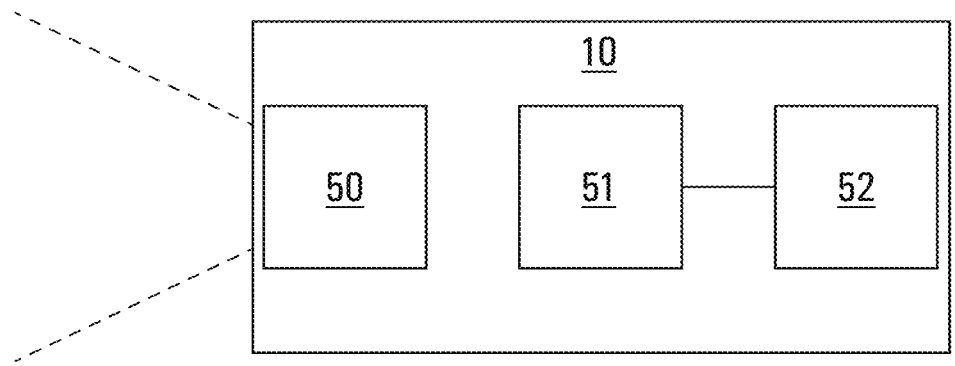
FIG. 12 shows a schematic diagram of a camera including a light source, a computer-readable medium, and a processor, according to an embodiment of the disclosure.

FIG. 12 shows a schematic diagram of camera 10 including a light source 50, a computer-readable medium 51, and a processor 52, according to an embodiment of the disclosure.

While light-refracting apparatus 20 has been described in the context of an integrated collimator and lens, according to other embodiments it is envisaged that the collimator and lens may be provided as separate components. For example, a collimator (comprising a light-receiving surface) may be adhered to an at least partially concave lens (comprising a light-emitting surface) using an optically neutral/clear adhesive.

Furthermore, while the camera described herein has been illustrated in the context of a bullet camera, the disclosure extends to other types of cameras, such as a dome camera, a box camera, or any other suitable image capture device.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A camera comprising:
    a housing;
    a light source positioned within the housing; and
    a light-refracting apparatus comprising:
        a recess at least partially enclosing the light source;
        a collimator shaped to collimate light emitted by the light source; and
        a lens comprising a light-emitting surface positioned to receive light collimated by the collimator and shaped to disperse the collimated light, the light-emitting surface having a single central concave portion and two convex portions extending from opposite sides of the single central concave portion to respective edges of the light-emitting surface,
    wherein the light-refracting apparatus is arranged to cause the dispersed light to be transmitted from within the housing into a field of view region of the camera,
    wherein the recess, the collimator and the lens are rectangular, a long axis of the recess extending about perpendicularly between the opposite sides of the single central concave portion and along the two convex portions such that a light beam emitted by the light source is shaped by the recess, the collimator and the lens to illuminate the field of view region, wherein the field of view region has at least a 110° horizontal extent and at least a 55° vertical extent.

2. The camera of claim 1, wherein the collimator is shaped to collimate, by total internal reflection, the light emitted by the light source.

3. The camera of claim 1, wherein the collimator comprises parabolic sidewalls for collimating the light emitted by the light source.

4. The camera of claim 1, wherein the light source comprises at least one of, one or more light-emitting diodes (LEDs); and one or more dual-filament LEDs.

5. The camera of claim 1, wherein the light source is positioned relative to the light-refracting apparatus such that substantially all light emitted by the light source enters the light-refracting apparatus.

6. The camera of claim 1, wherein the lens further comprises a light-receiving surface positioned such that light emitted by the light source enters the light-refracting apparatus through the light-receiving surface.

7. The camera of claim 6, wherein the light-emitting surface is positioned such that light having entered the light-refracting apparatus exits the light-refracting apparatus through the light-emitting surface.

8. The camera of claim 6, wherein the light-receiving surface is at least partially concave.

9. The camera of claim 6, wherein the single central concave portion of the light-receiving surface is two-dimensionally concave.

10. The camera of claim 1, wherein the recess, the collimator and the lens are integrally formed as the light-refracting apparatus, and wherein the light-emitting surface is a front surface of the light-refracting apparatus.

11. The camera of claim 10, wherein the lens further comprises a light-receiving surface, and wherein the light-receiving surface is a rear surface of the light-refracting apparatus.

12. The camera of claim 1, wherein the single central concave portion of the light-emitting surface is two-dimensionally concave.

13. The camera of claim 1, wherein the light-emitting surface comprises:
    one or more straight portions extending from the single central concave portion to the two convex portions.

14. The camera of claim 1, wherein the light source is a first light source, wherein the camera further comprises a second light source, and wherein the field of view region able to be illuminated by the first light source is larger than a field of view region able to be illuminated by the second light source.

15. The camera of claim 14, wherein:
    the field of view region able to be illuminated by the second light source has at least a 35° horizontal extent and at least a 35° vertical extent.

16. The camera of claim 14, further comprising a processor and a computer-readable medium, wherein the processor is communicatively coupled to the computer-readable medium, and the first and second light sources, and wherein the computer-readable medium has stored thereon computer program code executable by the processor and configured such that, when executed by the processor, the processor:
    activates the first light source in response to an object being detected in a near field; and
    activates the second light source in response to an object being detected in a far field.

17. The camera of claim 1, wherein the camera is a bullet camera, a box camera, or a dome camera.

18. The camera of claim 1, wherein the light source is operable to emit infrared light.

19. A light-refracting apparatus for a camera, comprising:
a recess for at least partially enclosing a light source;
a collimator shaped to collimate light having entered the collimator from the recess; and
a lens comprising a light-emitting surface positioned to receive light collimated by the collimator and shaped to disperse the collimated light, the light-emitting surface comprising a single central concave portion and two convex portions extending from opposite sides of the single central concave portion to respective edges of the light-emitting surface,
wherein the recess, the collimator and the lens are rectangular, a long axis of the recess extending about perpendicularly between the opposite sides of the single central concave portion and along two convex portions such that a light beam emitted by the light source is shaped by the recess, the collimator and the lens to illuminate a field of view region having at least a 110° horizontal extent and at least a 55° vertical extent.

20. The light-refracting apparatus of claim 19, wherein the single central concave portion comprises a portion of a surface of a cylinder, and the two convex portions comprise a first convex portion and a second convex portion each comprising respective portions of a respective surface of a respective cylinder, the first convex portion and the second convex portion located on opposite sides of the single central concave portion.

21. The light-refracting apparatus of claim 19, wherein, between horizontal angles of −55° and +55° of a light intensity pattern of the field of view, light intensity is at least about 30% of a maximum light intensity, and the light intensity pattern is about between the angles of −40° and +40°.

22. A lens comprising:
a recess for at least partially enclosing a light source;
a rear surface; and
a front surface, the front surface having a single central concave portion and two convex portions extending from opposite sides of the single central concave portion to respective edges of the front surface,
wherein the lens is shaped to collimate, by total internal reflection, light having entered the lens through the rear surface, and to disperse the collimated light through the front surface,
wherein the recess and the lens are rectangular, a long axis of the recess extending about perpendicularly between opposite sides of the single central concave portion and along the two convex portions such that the light having entered the lens is shaped by the lens to illuminate a field of view region having at least a 110° horizontal extent and at least a 55° vertical extent.

23. The lens of claim 22, further comprising parabolic sidewalls.

24. The lens of claim 22, wherein the single central concave portion comprises a portion of a surface of a cylinder, and the two convex portions comprise a first convex portion and a second convex portion each comprising respective portions of a respective surface of a respective cylinder, the first convex portion and the second convex portion located on opposite sides of the single central concave portion.

25. The lens of claim 22, wherein, between horizontal angles of −55° and +55° of a light intensity pattern of the field of view, light intensity is at least about 30% of a maximum light intensity, and the light intensity pattern is about between the angles of −40° and +40°.

26. The camera of claim 1, wherein the single central concave portion comprises a portion of a surface of a cylinder, and the two convex portions comprise a first convex portion and a second convex portion each comprising respective portions of a respective surface of a respective cylinder, the first convex portion and the second convex portion located on opposite sides of the single central concave portion.

27. The camera of claim 1, wherein, between horizontal angles of −55° and +55° of a light intensity pattern of the field of view, light intensity is at least about 30% of a maximum light intensity, and the light intensity pattern is about between the angles of −40° and +40°.

* * * * *